United States Patent
Sunfeer et al.

(10) Patent No.: US 12,212,967 B2
(45) Date of Patent: Jan. 28, 2025

(54) CONDITIONAL DEVICE ACCESS FOR ONE OR MORE ADDITIONAL AUTHORIZED USERS

(71) Applicant: QUALCOMM Incorporated, San Diego, CA (US)

(72) Inventors: Mohamed Sunfeer, Hyderabad (IN); Satish Begumpeta, Hyderabad (IN); Rakesh Pallerla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 387 days.

(21) Appl. No.: 17/658,906

(22) Filed: Apr. 12, 2022

(65) Prior Publication Data

US 2023/0328530 A1    Oct. 12, 2023

(51) Int. Cl.
*H04W 12/30* (2021.01)
*G06F 21/32* (2013.01)
*G06F 21/62* (2013.01)

(52) U.S. Cl.
CPC .......... *H04W 12/35* (2021.01); *G06F 21/32* (2013.01); *G06F 21/62* (2013.01)

(58) Field of Classification Search
None
See application file for complete search history.

(56) References Cited

U.S. PATENT DOCUMENTS

| 2018/0196988 A1* | 7/2018 | Tse | G06F 21/32 |
| 2021/0358244 A1* | 11/2021 | Chafni | G07C 9/257 |
| 2024/0143827 A1* | 5/2024 | Hay | G06F 21/316 |

FOREIGN PATENT DOCUMENTS

EP    3059675 A1    8/2016

OTHER PUBLICATIONS

International Search Report and Written Opinion—PCT/US2023/063709—ISA/EPO—Jun. 23, 2023.
Ni X., et al., "DiffUser: Differentiated User Access Control on Smartphones", 2009 IEEE 6th International Conference on Mobile Adhoc and Sensor Systems, Oct. 12, 2009, XP055282746, pp. 1012-1017.
Rohrer F., et al., "DR BACA: Dynamic Role Based Access Control for Android", Proceedings of the 29th Annual Computer Security Applications Conference, 1077952576, Dec. 9, 2013, XP058036009, pp. 299-308.

* cited by examiner

*Primary Examiner* — Adolf Dsouza
(74) *Attorney, Agent, or Firm* — QUALCOMM Incorporated

(57) ABSTRACT

This disclosure provides systems, methods and apparatus, including computer programs encoded on computer storage media, for determining whether either a first authorized user has accessed an apparatus within a time interval or whether a condition is met. In some examples, responsive to determining that the first authorized user has not accessed the apparatus within a time interval or that the condition is met, a second authorized user may be allowed at least partial access to the apparatus.

30 Claims, 7 Drawing Sheets

CONDITIONAL DEVICE ACCESS FOR ONE OR MORE ADDITIONAL AUTHORIZED USERS

TECHNICAL FIELD

This disclosure relates generally to methods, apparatus and systems for controlling access to devices, including but not limited to mobile devices.

DESCRIPTION OF THE RELATED TECHNOLOGY

Mobile devices such as cellular telephones have become nearly ubiquitous features of modern life. Although some existing biometric methods for controlling access to mobile devices provide acceptable performance under some conditions, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. According to some implementations, the apparatus may be, may include, or may be integrated into a mobile device. In some implementations, the apparatus may be, may include, or may be integrated into a cellular telephone In some examples, the apparatus may include a biometric authentication system and a control system configured for communication with (such as electrically or wirelessly coupled to) the biometric authentication system. According to some examples, the biometric authentication system may include a fingerprint sensor system. In some examples, the control system may include a memory. According to some examples, the control system may be configured for communication with a memory that is not part of the control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to determine whether either a) a first authorized user has accessed the apparatus within a time interval or b) a condition is met and, responsive to determining that the first authorized user has not accessed the apparatus within a time interval or that the condition is met, allow at least partial access to the apparatus by a second authorized user. In some examples, determining whether the first authorized user has accessed the apparatus within the time interval may involve determining whether the first authorized user has accessed the apparatus by successfully completing an authentication process involving the biometric authentication system within the time interval.

In some examples, allowing at least partial access to the apparatus may involve allowing at least partial access to data stored on the apparatus or data accessible via the apparatus. According to some examples, allowing at least partial access to the apparatus may involve allowing access to one or more software applications accessible via the apparatus. According to some such examples, allowing access to one or more software applications accessible via the apparatus may involve allowing access to one or more of a financial account app, a payment app, a tax preparation app or a social media app. In some examples, allowing at least partial access to the apparatus may involve allowing at least partial access to image data or video data stored on the apparatus or accessible via the apparatus. In some instances, allowing at least partial access to the apparatus may involve allowing complete access to all data stored on the apparatus, all data accessible via the apparatus and all software applications accessible via the apparatus.

In some instances, the control system may determine that the condition has not been met. In some such examples, the control system may be further configured to deny any access to the apparatus by the second authorized user responsive to determining that the first authorized user has accessed the apparatus within the time interval.

In some examples, the control system may determine that the first authorized user has accessed the apparatus within the time interval. In some such examples, the control system may be further configured to: receive, via the biometric authentication system, second authorized user biometric data; receive, via the biometric authentication system, third authorized user biometric data from a third authorized user; authenticate the second authorized user biometric data and the third authorized user biometric data; and allow at least partial access to the apparatus by the second authorized user, the third authorized user, or both the second authorized user and the third authorized user. In some such examples, the second authorized user biometric data may include fingerprint data corresponding to a second authorized user digit and the third authorized user biometric data may include fingerprint data corresponding to a third authorized user digit. According to some such examples, the second authorized user digit and the third authorized user digit may be specific digits.

In some examples, allowing at least partial access to the apparatus may involve allowing only partial access to data stored on the apparatus or data accessible via the apparatus. However, in other examples, allowing at least partial access to the apparatus may involve allowing complete access to all data stored on the apparatus, all data accessible via the apparatus and all software applications accessible via the apparatus.

In some implementations, the apparatus may include, or may be configured for communication with, a health evaluation system configured for obtaining health condition data corresponding to a health condition of the first authorized user and for providing the health condition data to the control system. According to some such implementations, determining whether the condition is met may be based, at least in part, on the health condition data. In some implementations, the health evaluation system may reside in a wearable device that is separate from, but configured for communication with, the apparatus. In some implementations, the health evaluation system may be configured for obtaining one or more types of cardiac data and wherein the health condition data may include the cardiac data. Alternatively, or additionally, the health evaluation system may be configured for obtaining respiratory data and the health condition data may include the respiratory data.

According to some examples, the apparatus may be configured to receive vehicle accident data corresponding to a vehicle owned or controlled by the first authorized user. In some such examples, determining whether the condition is met may be based, at least in part, on the vehicle accident data.

In some examples, the apparatus may be configured to receive SOS data from another device owned or controlled by the first authorized user. The SOS data may, for example, indicate an emergency involving the first authorized user. According to some examples, determining whether the condition is met may be based, at least in part, on the SOS data.

Other innovative aspects of the subject matter described in this disclosure may be implemented in a method. In some examples, the method may involve controlling access to an apparatus. For example, the method may involve determining whether either a) a first authorized user has accessed the apparatus within a time interval or b) a condition is met and, responsive to determining that the first authorized user has not accessed the apparatus within a time interval or that the condition is met, allowing at least partial access to the apparatus by a second authorized user. In some examples, allowing at least partial access to the apparatus may involve allowing at least partial access to data stored on the apparatus, allowing at least partial access to data accessible via the apparatus, allowing at least partial access to one or more software applications accessible via the apparatus, or combinations thereof. In some examples, the method may involve denying any access to the apparatus by the second authorized user responsive to determining that the first authorized user has accessed the apparatus within the time interval.

According to some examples, the method may involve obtaining health condition data corresponding to a health condition of the first authorized user. In some such examples, determining whether the condition is met may be based, at least in part, on the health condition data. The health condition data may include cardiac data, respiratory data, or a combination thereof.

Some or all of the operations, functions or methods described herein may be performed by one or more devices according to instructions (such as software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

For example, the software may include instructions for controlling one or more devices to perform a method. In some examples, the method may involve controlling access to an apparatus. For example, the method may involve determining whether either a) a first authorized user has accessed the apparatus within a time interval or b) a condition is met and, responsive to determining that the first authorized user has not accessed the apparatus within a time interval or that the condition is met, allowing at least partial access to the apparatus by a second authorized user. In some examples, allowing at least partial access to the apparatus may involve allowing at least partial access to data stored on the apparatus, allowing at least partial access to data accessible via the apparatus, allowing at least partial access to one or more software applications accessible via the apparatus, or combinations thereof. In some examples, the method may involve denying any access to the apparatus by the second authorized user responsive to determining that the first authorized user has accessed the apparatus within the time interval.

According to some examples, the method may involve obtaining health condition data corresponding to a health condition of the first authorized user. In some such examples, determining whether the condition is met may be based, at least in part, on the health condition data. The health condition data may include cardiac data, respiratory data, or a combination thereof.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
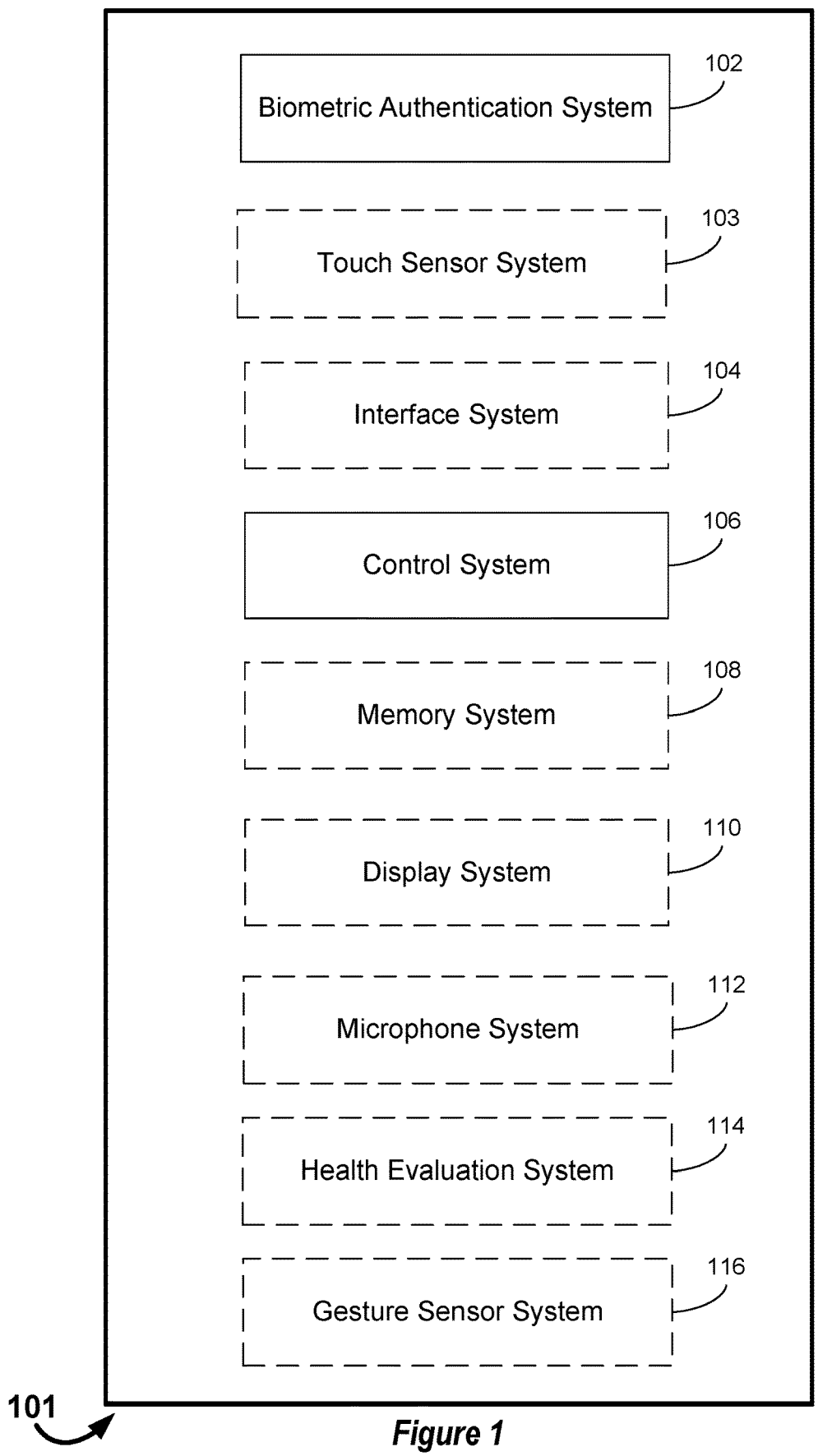
FIG. 1 is a block diagram that presents example components of an apparatus.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (such as e-readers), mobile health devices, computer monitors, automobile components, including but not limited to automobile displays (such as odometer and speedometer displays, etc.), cockpit controls or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

It is common for people store important data, some of which may be confidential data, such that the data is accessible via one or more personal devices. Such personal device(s) may include a mobile phone, a laptop, a tablet, a wearable device, etc. In some examples, such data may be stored in a memory system of one or more personal devices. Alternatively, or additionally, such data may be accessible via one or more personal devices but may be stored on one or more other devices, such as on one or more storage devices, one or more servers, etc., of a data center. The important data may, for example, include still image data, video data, personal or professional communications (such as texts, emails, etc.), financial information (such as financial account information, tax information, digital wallet information, cryptocurrency information, one or more Social Security numbers, etc.), other personal or confidential information, or combinations thereof. The important data may pertain to a user of the personal device(s), to a business with which the user is involved, to one or more family members, to one or more other people who have a close relationship with the user of the personal device(s), or combinations thereof.

Access to such important data may, in some examples, be protected via a password-based authentication process, via a biometric authentication system, or combinations thereof. The biometric authentication system may include a fingerprint sensor system, a facial recognition system, etc., that is configured to perform an authentication process based on biometric data obtained from an authorized user. Controlling access to the important data may include controlling access to one or more software applications accessible via the apparatus. If the authorized user dies or is incapacitated, access to the important data may be lost, or at the least may be made more difficult. A primary authorized user could avoid such potential loss of access to the important data by allowing one or more secondary authorized users to have access to the important data. However, allowing access to other authorized users reduces the level of privacy of the primary authorized user. Moreover, the more people who have access to the important data, the higher the risk that unauthorized people may gain access to the important data.

Some disclosed methods may involve conditional access to an apparatus by one or more additional authorized users, in addition to a primary authorized user. Allowing access to the apparatus may involve allowing access to data stored on the apparatus, data accessible via the apparatus, one or more software applications accessible via the apparatus, or combinations thereof. In some examples, an apparatus control system may allow at least partial access to the apparatus by a second authorized user responsive to determining that the first authorized user has not accessed the apparatus within a time interval, which may be a user-selectable time interval. According to some such examples, if the first authorized user has not accessed the apparatus within the time interval, it may be presumed that the first authorized user is dead or incapacitated. In some implementations, even if the first authorized user has accessed the apparatus within the time interval, apparatus control system may allow at least partial access to the apparatus by a second authorized user, a third authorized user, or both, responsive to receiving biometric data from both the second authorized user and the third authorized user.

Alternatively, or additionally, in some examples an apparatus control system may allow at least partial access to the apparatus by a second authorized user responsive to determining that a condition has been met. According to some such examples, the apparatus may include, or may be configured for communication with, a health evaluation system configured for obtaining health condition data from the first authorized user. In some examples, the health condition data may include cardiac data, respiratory data, or a combination thereof. Determining whether the condition is met may be based, at least in part, on the health condition data. According to some examples, determining whether the condition is met may be based, at least in part, on vehicle accident data corresponding to a vehicle owned or controlled by the first authorized user.

Particular implementations of the subject matter described in this disclosure may be implemented to realize one or more of the following potential advantages. By allowing only conditional access to an apparatus to one or more additional authorized users, a primary authorized user (also referred to herein as a "first authorized user") can retain higher levels of privacy and data security than if the one or more additional authorized users could access the apparatus at any time. In some examples, the primary authorized user may retain exclusive authorized access to the apparatus until the primary authorized user is incapacitated or dead, or presumed incapacitated or dead. According to some such examples, the primary authorized user may be presumed to be incapacitated or dead after a predetermined time interval of non-access to the apparatus by the primary authorized user. In other examples, the primary authorized user may be presumed to be incapacitated or dead according to health condition data obtained from the first authorized user. In such examples, access to confidential, private or otherwise sensitive data will not be lost upon the primary authorized user's death, but instead may be obtained by another trusted person. In other examples, at least partial access to the apparatus may be granted if health condition data indicates that the first authorized user is gravely ill, has fallen, has been in a serious vehicle accident, etc. According to some such examples, the primary authorized user may retain exclusive authorized access to the apparatus until there is an indication of a serious health condition, such as a heart attack, a stroke, severe injuries from a vehicle accident, etc.

FIG. 1 is a block diagram that presents example components of an apparatus. In this example, the apparatus 101 includes a control system 106 and a biometric authentication system 102. Some implementations may include an interface system 104, a touch sensor system 103, a memory system 108, a display system 110, a microphone system 112, a health evaluation system 114, a gesture sensor system 116, or combinations thereof.

In some examples, the biometric authentication system 102 may be, or may include, a facial recognition system. Alternatively, or additionally, the biometric authentication system 102 may be, or may include, a voice recognition system. Alternatively, or additionally, the biometric authentication system 102 may include a retinal scanner and a retinal scan recognition system.

Alternatively, or additionally, the biometric authentication system 102 may include a fingerprint sensor. In some such examples, the biometric authentication system 102 may be, or may include, a ultrasonic fingerprint sensor. Alternatively, or additionally, in some implementations the biometric authentication system 102 may be, or may include, an optical fingerprint sensor. In some examples, an ultrasonic version of the biometric authentication system 102 may include an ultrasonic receiver and a separate ultrasonic transmitter. In some such examples, the ultrasonic transmitter may include an ultrasonic plane-wave generator. However, various examples of ultrasonic fingerprint sensors are disclosed herein, some of which may include a separate ultrasonic transmitter and some of which may not. For example, in some implementations, the biometric authentication system 102 may include a piezoelectric receiver layer, such as a layer of polyvinylidene fluoride PVDF polymer or a layer of polyvinylidene fluoride-trifluoroethylene (PVDF-TrFE) copolymer. In some implementations, a separate piezoelectric layer may serve as the ultrasonic transmitter. In some implementations, a single piezoelectric layer may serve as both a transmitter and a receiver. The biometric authentication system 102 may, in some examples, include an array of ultrasonic transducer elements, such as an array of piezoelectric micromachined ultrasonic transducers (PMUTs), an array of capacitive micromachined ultrasonic transducers (CMUTs), etc. In some such examples, PMUT elements in a single-layer array of PMUTs or CMUT elements in a single-layer array of CMUTs may be used as ultrasonic transmitters as well as ultrasonic receivers.

Data received from the biometric authentication system 102 may sometimes be referred to herein as "biometric data." Data received from a fingerprint sensor of the biometric authentication system 102 may sometimes be referred to herein as "fingerprint sensor data," "fingerprint image data," etc., although the data will generally be received from the fingerprint sensor system in the form of electrical signals. Accordingly, without additional processing such image data would not necessarily be perceivable by a human being as an image.

The touch sensor system 103 (if present) may be, or may include, a resistive touch sensor system, a surface capacitive touch sensor system, a projected capacitive touch sensor system, a surface acoustic wave touch sensor system, an infrared touch sensor system, or any other suitable type of touch sensor system. In some implementations, the area of the touch sensor system 103 may extend over most or all of a display portion of the display system 110.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to some examples, the control system 106 also may include one or more memory devices, such as one or more random access memory (RAM) devices, read-only memory (ROM) devices, etc. In this example, the control system 106 is configured for communication with, and for controlling, the biometric authentication system 102. In implementations where the apparatus includes a touch sensor system 103, the control system 106 is configured for communication with, and for controlling, the touch sensor system 103. In implementations where the apparatus includes a memory system 108 that is separate from the control system 106, the control system 106 also may be configured for communication with the memory system 108. In implementations where the apparatus includes a microphone system 112, the control system 106 is configured for communication with, and for controlling, the microphone system 112. In implementations where the apparatus includes a health evaluation system 114, the control system 106 is configured for communication with, and for controlling, the health evaluation system 114. According to some examples, the control system 106 may include one or more dedicated components for controlling the biometric authentication system 102, the touch sensor system 103, the memory system 108, the display system 110, the microphone system 112 or the health evaluation system 114. In some implementations, functionality of the control system 106 may be partitioned between one or more controllers or processors, such as between a dedicated sensor controller and an applications processor of a mobile device.

In some examples, the memory system 108 may include one or more memory devices, such as one or more RAM devices, ROM devices, etc. In some implementations, the memory system 108 may include one or more computer-readable media, storage media or storage media. Computer-readable media include both computer storage media and communication media including any medium that may be enabled to transfer a computer program from one place to another. Storage media may be any available media that may be accessed by a computer. In some examples, the memory system 108 may include one or more non-transitory media. By way of example, and not limitation, non-transitory media may include RAM, ROM, electrically erasable programmable read-only memory (EEPROM), compact disc ROM (CD-ROM) or other optical disk storage, magnetic disk storage or other magnetic storage devices, or any other medium that may be used to store desired program code in the form of instructions or data structures and that may be accessed by a computer.

Some implementations of the apparatus 101 may include an interface system 104. In some examples, the interface system 104 may include a wireless interface system. In some implementations, the interface system 104 may include a user interface system, one or more network interfaces, one or more interfaces between the control system 106 and the biometric authentication system 102, one or more interfaces between the control system 106 and the touch sensor system 103, one or more interfaces between the control system 106 and the memory system 108, one or more interfaces between the control system 106 and the display system 110, one or more interfaces between the control system 106 and the microphone system 112, one or more interfaces between the control system 106 and the health evaluation system 114, one or more interfaces between the control system 106 and the gesture sensor system 116, one or more interfaces between the control system 106 and one or more external device interfaces (such as ports or applications processors), or combinations thereof.

The interface system 104 may be configured to provide communication (which may include wired or wireless communication, electrical communication, radio communication, etc.) between components of the apparatus 101. In some such examples, the interface system 104 may be configured to provide communication between the control system 106 and the biometric authentication system 102. According to some such examples, the interface system 104 may couple at least a portion of the control system 106 to the biometric authentication system 102 and the interface system 104 may couple at least a portion of the control system 106 to the touch sensor system 103, such as via electrically conducting material (for example, via conductive metal wires or traces). According to some examples, the interface system 104 may be configured to provide communication between the apparatus 101 and one or more other devices, such as a device that includes a health evaluation system 114. In some examples, the interface system 104 may be configured to provide communication between the apparatus 101 and a human being. In some such examples, the interface system 104 may include one or more user interfaces. In some examples, the user interface(s) may be provided via the touch sensor system 103, the display system 110, the microphone system 112, the gesture sensor system, or combinations thereof. According to some examples, the interface system 104 may include a haptic feedback system. The interface system 104 may, in some examples, include one or more network interfaces or one or more external device interfaces (such as one or more universal serial bus (USB) interfaces or a serial peripheral interface (SPI)).

In some examples, the apparatus 101 may include a display system 110 having one or more displays. In some examples, the display system 110 may be, or may include, a light-emitting diode (LED) display, such as an organic light-emitting diode (OLED) display. In some such examples, the display system 110 may include layers, which may be referred to collectively as a "display stack."

In some implementations, the apparatus 101 may include a microphone system 112. The microphone system 112 may include one or more microphones.

According to some implementations, the apparatus 101 may include a health evaluation system 114. The health evaluation system 114 may include one or more types of sensors for health evaluation, such as one or more gyroscopes, accelerometers, optical sensors, apparatus for measuring cardiac functions, apparatus for measuring respiratory functions, or combinations thereof. The health evaluation system 114 may be configured to provide health condition data to the control system 106 indicating the health of a user of the apparatus 101, such as the "first authorized user" referenced herein. In some examples, the health evaluation system 114 may be configured for obtaining one or more types of cardiac data, such as heart rate data, blood pressure data, etc. In some such examples, the health condition data may include the cardiac data. According to some examples, the health evaluation system 114 may be configured for obtaining one or more types of respiratory data, such as breath rate data. In some such examples, the health condition data may include the respiratory data. In some examples, the health evaluation system 114 may be configured for obtaining one or more types of blood-related data, such as estimated blood oxygen levels. In some such examples, the health condition data may include the blood-related data. According to some examples, the health evaluation system 114 may include an inertial sensor system that is configured for obtaining accelerometer data. Accordingly, in some examples, the health condition data may include the accelerometer data. In some instances, the accelerometer data may indicate a rapid deceleration indicating that the first authorized user has fallen, has been in a vehicle accident, etc.

In some implementations, the apparatus 101 may include a gesture sensor system 116. The gesture sensor system 116 may be, or may include, an ultrasonic gesture sensor system, an optical gesture sensor system or any other suitable type of gesture sensor system. One example of a gesture sensor system 116 is described below with reference to FIG. 7.

The apparatus 101 may be used in a variety of different contexts, some examples of which are disclosed herein. For example, in some implementations a mobile device may include at least a portion of the apparatus 101. In some implementations, a wearable device may include at least a portion of the apparatus 101. The wearable device may, for example, be a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (for example, a smartphone). The interface system 104 also may, in some such examples, reside in more than one device.

Figure 2:
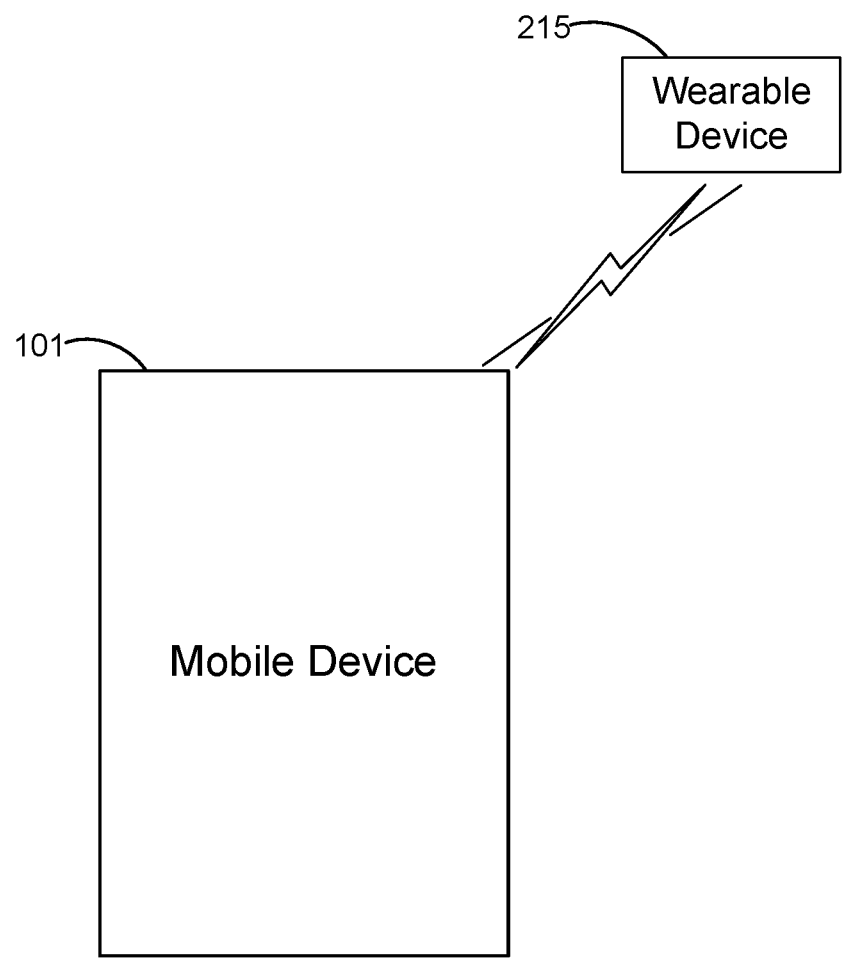
FIG. 2 presents an example of the apparatus of FIG. 1 that is configured for communication with another device.

FIG. 2 presents an example of the apparatus of FIG. 1 that is configured for communication with another device. The numbers, types and arrangements of elements shown in the figures provided herein, including but not limited to FIG. 2, are merely examples. Other examples may include different elements, different arrangements of elements, or combinations thereof. According to this example, the apparatus 101 is a mobile device, such as a cellular telephone. FIG. 2 also illustrates a wearable device 215 that is configured for wireless communication with the apparatus 101. The wearable device 215 may, for example, be a watch, one or more earbuds, headphones, another accessory device, etc. In this example, the same person is the primary authorized user (also referred to herein as the "first authorized user") for both the apparatus 101 and the wearable device 215.

In this implementation, the wearable device 215 includes an instance of the health evaluation system 114 that is described with reference to FIG. 1. The health evaluation system 114 of the wearable device 215 is configured for obtaining health condition data corresponding to one or more health conditions of the first authorized user. The health evaluation system 114 may include one or more types of sensors for health evaluation, such as one or more gyroscopes, accelerometers, optical sensors, apparatus for measuring cardiac functions, apparatus for measuring respiratory functions, or combinations thereof. In this example, the wearable device 215 is configured to provide health condition data that is obtained by the health evaluation system 114 to the control system 106 of the apparatus 101. In some examples, the health evaluation system 114 may be configured for obtaining one or more types of cardiac data, such as heart rate data, blood pressure data, etc. In some such examples, the health condition data may include the cardiac data. According to some examples, the health evaluation system 114 may be configured for obtaining one or more types of respiratory data, such as breath rate data. In some such examples, the health condition data may include the respiratory data. In some examples, the health evaluation system 114 may be configured for obtaining one or more types of blood-related data, such as estimated blood oxygen levels. In some such examples, the health condition data may include the blood-related data. According to some examples, the health evaluation system 114 may include an inertial sensor system that is configured for obtaining accelerometer data and the health condition data may include the accelerometer data. In some instances, the accelerometer data may indicate a rapid deceleration indicating that the first authorized user has fallen, has been in a vehicle accident, etc.

Figure 3:
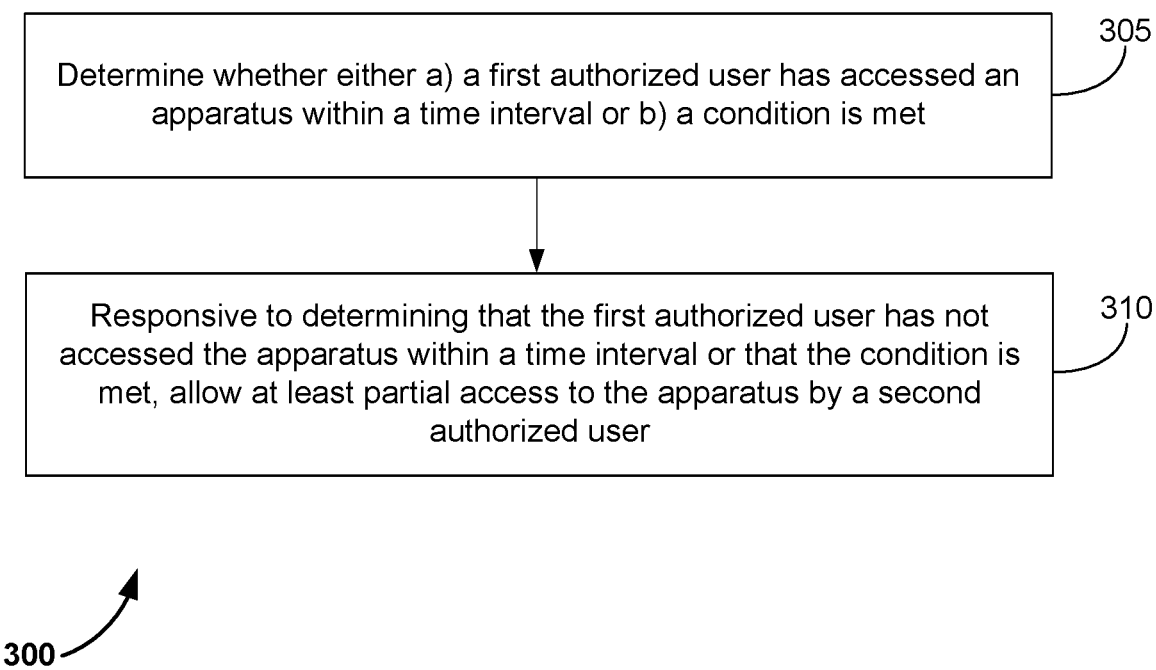
FIG. 3 is a flow diagram that presents examples of operations according to some disclosed methods.

FIG. 3 is a flow diagram that presents examples of operations according to some disclosed methods. The blocks of FIG. 3 may, for example, be performed by the apparatus 101 of FIG. 1, by the apparatus 101 of FIG. 2, or by a similar apparatus. For example, in some instances method 300 may be performed, at least in part, by the control system 106 of FIG. 1. As with other methods disclosed herein, the methods outlined in FIG. 3 may include more or fewer blocks than indicated. Moreover, the blocks of methods disclosed herein are not necessarily performed in the order indicated. In some implementations, one or more blocks may be performed concurrently.

In this example, block 305 involves determining whether either a first authorized user has accessed an apparatus within a time interval or whether a condition is met. The "first authorized user" of the apparatus is also referred to herein as a primary user of the apparatus. In some examples, the apparatus may be a mobile device, such as a cellular telephone. However, in other examples, the apparatus may be another type of device, such as a tablet, a laptop, an automobile or component thereof, a wearable device, etc.

The time interval may vary according to the particular implementation. In some instances, the time interval may be selectable, e.g., according to user input (such as via a GUI presented on the apparatus 101). In some examples, the time interval may be on the order of days, such as 1 day, 2 days, 3 days, 4 days, 5 days, 6 days, 7 days, 8 days, 9 days, 10 days, etc. In some examples, the time interval may be on the order of weeks, such as 1 week, 2 weeks, 3 weeks, etc. In some examples, the time interval may be on the order of hours, such as 18 hours, 24 hours, 30 hours, 36 hours, 42 hours, 48 hours, 54 hours, 60 hours, etc. In some examples, the time interval may be selected according to the frequency of apparatus use by the first authorized user of the apparatus. For example, the time interval may be selected such that if the first authorized user has not accessed the apparatus within the time interval, there is a reasonable likelihood that the first authorized user may be dead or incapacitated.

In some implementations, the apparatus may include a biometric authentication system and a control system that is configured for communication with the biometric authentication system. The biometric authentication system may, in some examples, include a fingerprint sensor system, a facial recognition system, a retinal scanner and a retinal scan recognition system, a voice recognition system, etc., or combinations thereof. The control system may, in some implementations, be configured to perform an authentication process based, at least in part, on biometric data obtained via the biometric authentication system. In some examples, determining whether the first authorized user has accessed the apparatus within the time interval may involve determining whether the first authorized user has unlocked the apparatus by successfully completing an authentication process involving the biometric authentication system within the time interval. In other examples, determining whether the first authorized user has accessed the apparatus within the time interval may involve determining whether the first authorized user has unlocked the apparatus by entering a password or pass code.

According to this example, responsive to determining that the first authorized user has not accessed the apparatus within a time interval or that the condition is met, block 310 involves allowing at least partial access to the apparatus by a second authorized user. For example, allowing at least partial access to the apparatus may involve allowing at least partial access to data stored on the apparatus or to data accessible via the apparatus. In some such examples, allowing at least partial access to the apparatus may involve allowing at least partial access to image data or video data stored on the apparatus or accessible via the apparatus. According to some examples, allowing at least partial access to the apparatus may involve allowing access to one or more software applications or "apps" accessible via the apparatus. The software applications may, in some instances, include one or more financial account apps, one or more payment apps, one or more tax preparation apps, one or more social media apps, or combinations thereof. In some instances, allowing at least partial access to the apparatus may involve allowing complete access to all data stored on the apparatus, all data accessible via the apparatus and all software applications accessible via the apparatus.

In some examples, the data, software, etc., to which access will be allowed in block 310 may be selectable by the first authorized user. Some implementations may provide a graphical user interface (GUI) with which a user may interact to select the data, software, etc., to which access will be allowed in block 310.

According to this example, method 300 involves allowing at least partial access to the apparatus by a second authorized user even if the first authorized user has accessed the apparatus within the time interval, provided that the condition is met. However, some examples of method 300 may involve denying any access to the apparatus by the second authorized user alone responsive to determining that the first authorized user has accessed the apparatus within the time interval, whether or not the condition is met. For example, a control system of the apparatus may be configured to deny any access to the apparatus by the second authorized user alone responsive to determining that the first authorized user has accessed the apparatus within the time interval, whether or not the condition is met.

However, some examples may involve allowing at least partial access to the apparatus by the second authorized user under some conditions, even if the first authorized user has accessed the apparatus within the time interval and even if the condition is not met. Some such examples may involve allowing only partial access to data stored on the apparatus, data accessible via the apparatus, software accessible via the apparatus, etc., whereas other examples may involve allowing complete access to data stored on the apparatus, data accessible via the apparatus, software accessible via the apparatus, etc.

Some such examples may require input from more than one conditionally authorized user, for example from the second authorized user and from a third authorized user, in order to allow at least partial access to the apparatus if the first authorized user has accessed the apparatus within the time interval and if the condition is not met. Some such examples may involve receiving, via the biometric authentication system, second authorized user biometric data from the second authorized user and third authorized user biometric data from third authorized user. Some such examples may involve successfully completing an authentication process that is based, at least in part, on the second authorized user biometric data and the third authorized user biometric data. Some such examples may involve allowing at least partial access to the apparatus by the second authorized user, the third authorized user, or to both the second authorized user and the third authorized user.

Some such examples may require specific types of input from more than one conditionally authorized user. For example, a specific type of second authorized user biometric data may be required from the second authorized user and a specific type of third authorized user biometric data may be required from the third authorized user. Alternatively, or additionally, in some examples a first password, or pass code, may be required from the second authorized user and a second password, or pass code, may be required from the third authorized user.

In some examples, the second authorized user biometric data may be, or may include, fingerprint data corresponding to a second authorized user digit and the third authorized user biometric data may be, or may include, fingerprint data corresponding to a third authorized user digit. In one such example, fingerprint data corresponding to the right thumb of the second authorized user and fingerprint data corresponding to the left thumb of the third authorized user may be required. In another such example, fingerprint data corresponding to the left index finger of the second authorized user and fingerprint data corresponding to the left pinky finger of the third authorized user may be required. In other examples, a successful retinal scan of the right eye of the second authorized user and a successful retinal scan of the left eye of the third authorized user may be required. In some alternative examples, one type of biometric data (such as facial image data from a facial scan) may be required from the second authorized user and another type of biometric data (such as fingerprint data from a particular digit) may be required from the third authorized user.

According to some examples, determining whether the condition is met may be based, at least in part, on health condition data. As noted elsewhere herein, in some implementations the apparatus may include, or may be configured for communication with, a health evaluation system. The health evaluation system may be configured for obtaining health condition data corresponding to a health condition of the first authorized user. The health evaluation system may be configured for providing the health condition data to a control system, such as a control system of the apparatus. In some such implementations, the control system may be configured to determine whether the condition is met based, at least in part, on the health condition data.

In some instances, the health evaluation system may be configured for obtaining one or more types of cardiac data. According to some such instances, the health condition data may include the cardiac data. Determining whether the condition is met may be based, at least in part, on the cardiac data. For example, if the cardiac data indicates that the first authorized user has suffered a major heart attack, in some instances a control system may determine that the condition has been met. If the cardiac data indicates that the first authorized user's heart has stopped beating for a predetermined time interval (such as tens of seconds, a minute, etc.), in some instances a control system may determine that the condition has been met.

In some examples, the health evaluation system may be configured for obtaining one or more types of respiratory data. According to some such instances, the health condition data may include the respiratory data. Determining whether the condition is met may be based, at least in part, on the respiratory data. For example, if the respiratory data indicates that the first authorized user has stopped breathing for a predetermined time interval (such as tens of minutes, an hour, etc.), in some instances a control system may determine that the condition has been met.

According to some examples, the health evaluation system 114 may include an inertial sensor system that is configured for obtaining accelerometer data. The health condition data may include accelerometer data from the inertial sensor system. In some instances, the accelerometer data may indicate a rapid deceleration, indicating that the first authorized user has fallen, has been in a vehicle accident, etc.

In some implementations, the health evaluation system may reside in the apparatus. In some such implementations, the apparatus may be, or may include, a wearable device. However, in some implementations the health evaluation system may reside in a wearable device that is separate from, but configured for communication with, the apparatus. According to some examples, the health condition data may be transmitted not only to one or more other devices owned or controlled by the first authorized user, but also to one or more other devices owned or controlled by the second authorized user, the third authorized user, another authorized user, or a combination thereof. For example, if the health condition data indicates that the first authorized user may be dead, incapacitated, etc., the health condition data also may be transmitted to one or more other devices owned or controlled by the second authorized user, the third authorized user, or another authorized user, in order to alert other people to the health condition of the first authorized user.

According to some implementations, the apparatus may be configured to receive vehicle data corresponding to a vehicle owned or controlled by the first authorized user. In some implementations, the vehicle data may be, may include, or may indicate, vehicle accident data. According to some such implementations, determining whether the condition is met may be based, at least in part, on the vehicle accident data. In some such examples, the vehicle accident data may be, or may include, vehicle sensor data from one or more sensors residing in or on the vehicle, such as one or more accelerometers, one or more cameras, one or more air bag sensors, heat sensors, etc. In some such examples, the vehicle accident data may be transmitted to the apparatus from the vehicle. In other examples, the vehicle accident data may be transmitted to the apparatus from another source, such as an app associated with the vehicle, a traffic control app, a government-controlled app or device, such as an app or device controlled by a state highway patrol, an app or device controlled by a first responder, such as an ambulance service, a firefighting service, etc. According to some examples, the vehicle accident data may be transmitted not only to one or more other devices owned or controlled by the first authorized user, but also to one or more other devices owned or controlled by the second authorized user, the third authorized user, or another authorized user.

In some implementations, the apparatus may be configured to receive SOS data from another device owned or controlled by the first authorized user. In some instances, the SOS data may indicate an emergency involving the first authorized user. According to some examples, determining whether the condition is met may be based, at least in part, on the SOS data. In some instances, the SOS data may be transmitted by a home alarm system, by a device associated by the home alarm system (such as a fob, a tablet or a keypad) or by a service associated with the home alarm system. In some instances, the SOS data may be transmitted by a wearable device, such as a watch. In some examples, the SOS data may be transmitted by a key fob, such as an alarm system key fob or a vehicle key fob. According to some examples, the SOS data may be transmitted not only to one or more other devices owned or controlled by the first authorized user, but also to one or more other devices owned or controlled by the second authorized user, the third authorized user, or another authorized user.

FIGS. 4A, 4B, 4C, 4D and 4E show examples of graphical user interfaces (GUIs) for configuring conditional access to a device. The numbers, types and arrangements of elements shown in the figures provided herein, including but not limited to those of FIGS. 4A-4E, are merely examples. Other examples may include different elements, different arrangements of elements, or combinations thereof. In some implementations, an audio prompt may be presented instead of, or addition to, textual prompts like those of FIGS. 4A-4E. In these examples, the apparatus 101 shown in FIGS. 4A-4E is an instance of the apparatus 101 of FIG. 1. According to these examples, the control system 106 (not shown) is controlling the display system 110 to present the GUIs 400a-400e.

Figure 4D:
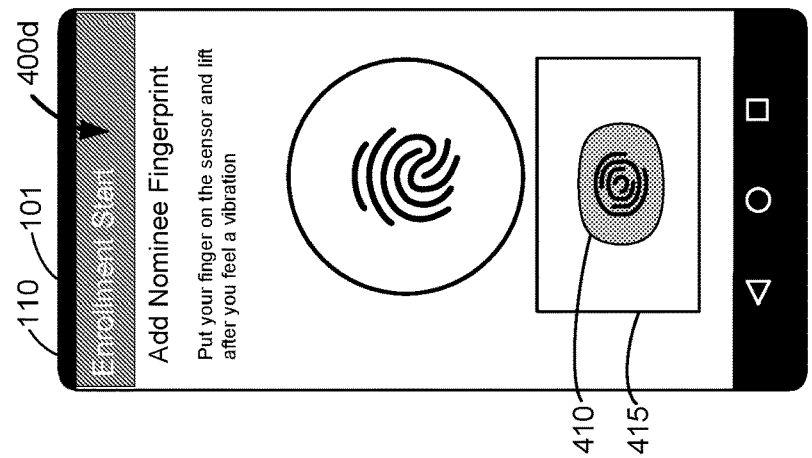
FIGS. 4A, 4B, 4C, 4D and 4E show examples of graphical user interfaces (GUIs) for configuring conditional access to a device.
Figure 4C:
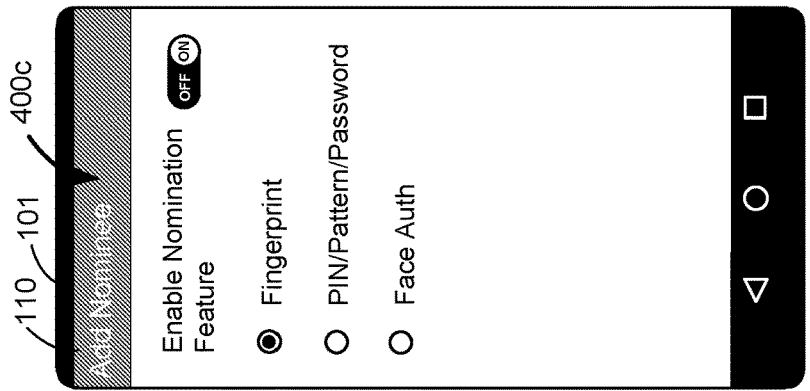
Figure 4B:
Figure 4A:
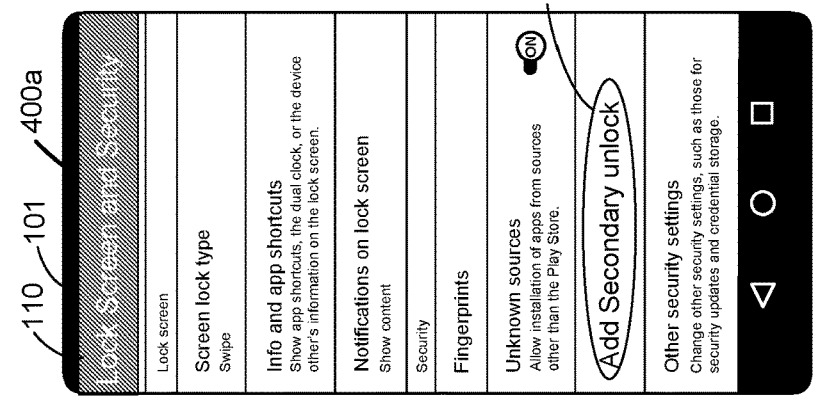

FIG. 4A shows an example of a GUI 400a for initiating a process of specifying parameters for conditional access to a device. In this example, the GUI 400a is a "Lock Screen and Security" GUI, which allows a user to specify details of what will be displayed on the apparatus 101 when the apparatus 101 is locked and to specify details of security features. In this example, a user (such as the "first authorized user" of this disclosure) may interact with "Add Secondary Unlock" area 405 of GUI 400a to initiate a process of specifying parameters for conditional access to the apparatus 101.

FIG. 4B shows an example of a GUI 400b for adding "secondary unlock" features. In this example, the GUI 400b includes an "Add Emergency Unlock" area, with which a user may interact (in this example, by touching the circle displayed adjacent the "Add Emergency Unlock" text) to enable an emergency unlock feature. Some examples are described below with reference to FIGS. 5A-5E.

In this example, the GUI 400b also includes an "Add Nominee" area, with which a user may interact to provide information corresponding to one or more nominees who will be granted conditional access to the apparatus 101. The nominee may, for example, correspond to the "second authorized user" or the "third authorized user" of this disclosure. The information corresponding to the one or more nominees may, for example, include one or more types of biometric data.

FIG. 4C shows an example of a GUI 400c that may be presented after a user has interacted with the "Add Nominee" area of the GUI 400b. According to this example, the GUI 400c includes an "Enable Nomination Feature" area which a user may toggle on or off in order to indicate whether a nominee will be added. In some alternative examples, the GUI 400c may not include an "Enable Nomination Feature" area. In some such examples, this feature may be automatically enabled when a user selects the "Add Nominee" area of the GUI 400b. In this example, the user may select one or more authentication methods for the nominee: here, the authentication methods include fingerprint-based authentication, PIN/pattern/password-based authentication and facial-image-based authentication methods. According to some examples, responsive to receiving an indication of a selected authentication method via the GUI 400c (or a similar GUI), the apparatus 101 may be configured to present one or more GUIs regarding a selected authentication method. For example, responsive to receiving an indication that a PIN/pattern/password-based authentication method has been selected via the GUI 400c (or a similar GUI), the apparatus 101 may be configured to present one or more GUIs allowing a user to enter a personal identification number (PIN), to enter a password, to select a pattern (such as by tracing the pattern via the touch sensor system 103), or combinations thereof.

FIG. 4D shows an example of a GUI 400d that may be presented after a user has selected the "Fingerprint" authentication method of the GUI 400c. According to this example, the GUI 400d includes a fingerprint icon 410 within an area 415. In some examples, the area 415 may correspond with an active area of a fingerprint sensor system, which may be a component of the biometric authentication system 102 that is described with reference to FIG. 1. In this example, the GUI 400d includes a textual prompt for the nominee to place a finger on the fingerprint icon 410 (or at least within the area 415) and to lift the finger after the nominee detects a vibration. The vibration may, for example, be caused by a haptic feedback system of the apparatus 101, which may be part of the interface system 104 in some implementations. In some such examples, the control system 106 may be configured to activate the haptic feedback system after fingerprint image data has been successfully obtained by a fingerprint sensor system. In some implementations, the GUI 400d may include a textual prompt for the nominee to place a particular digit (such as the right thumb, the left pinky finger, etc.) on the fingerprint icon 410 (or at least within the area 415).

According to some examples, one or more additional GUIs may be presented to allow the first authorized user to choose details of providing conditional access to one or more additional authorized users. For example, the user may be able to select a time interval. The time interval may be a time interval after which, if the first authorized user has accessed the apparatus 101, at least partial access to the apparatus 101 will be granted to a second authorized user. Accordingly, the time interval may be the time interval that is described with reference to block 305 of FIG. 3. In some examples, the user may be able to select a condition that needs to be met in order to allow one or more other authorized users to access the device. In some instances, the condition may be a health condition of the first authorized user. In some examples, the condition may be a vehicle accident condition. In some instances, the condition may be an emergency condition, for example as indicated by SOS data.

Figure 4E:
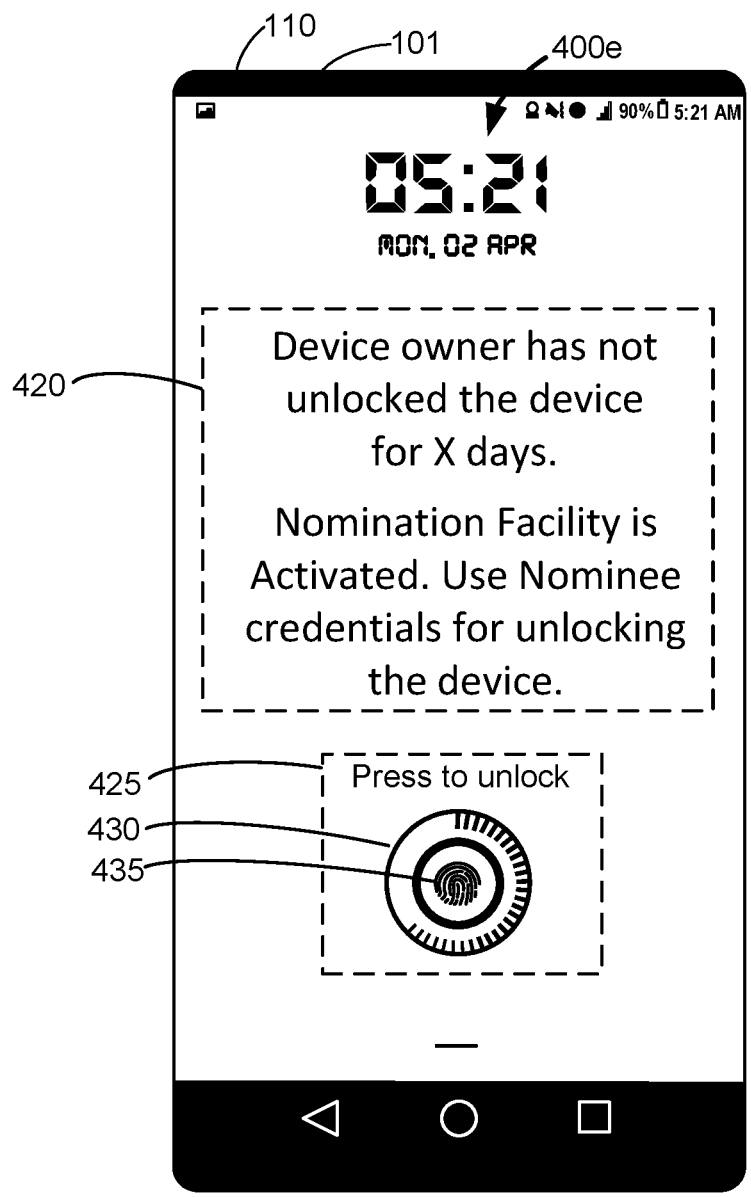

FIG. 4E shows an example of a GUI 400e that may be presented responsive to the control system 106 of the apparatus 101 determining that the first authorized user has not accessed the apparatus within a time interval. In some implementations, a similar GUI may be presented responsive to determining that a condition is met. In some examples, the GUI 400e may be presented responsive to a determination of block 305 of FIG. 3. According to some such examples, the GUI 400e may be presented prior to block 310, or as part of block 310.

In this example, area 420 of the GUI 400e includes text stating that the device owner (also referred herein as the "first authorized user") has not accessed the apparatus 101 (in this example, has not unlocked the apparatus 101) in X days and that a nomination facility is activated. In some examples, X may correspond with the time interval that is described with reference to block 305 of FIG. 3. In other examples, X may correspond with a total time interval from the last time the first authorized user unlocked the apparatus 101 to the time at which the GUI 400e is being presented. According to some such examples, X will be greater than or equal to the time interval that is described with reference to block 305. In some alternative examples, X may be expressed in another unit of time, such as hours or weeks.

In this instance, the "nomination facility" of area 420 involves one of the disclosed methods of conditional access to the apparatus 101 by one or more nominees (such as the "second authorized user" of this disclosure). According to this example, area 420 also includes a textual prompt for a nominee to use "nominee credentials" for unlocking the apparatus 101. The nominee credentials may, for example, correspond with one or more authentication methods (also referred to herein as nomination features). In some examples, the nominee credentials may correspond to nomination features that are user-selectable, for example by a GUI such as the GUI 400c of FIG. 4C.

In this implementation, the "nominee credentials" for unlocking the apparatus 101 include fingerprint image data. Accordingly, in this example, area 425 of the GUI 400e includes a textual prompt for a nominee to place a finger on the fingerprint icon 435 (or at least within the area 430). In this example, at least a portion of the area 425 corresponds with an active area of a fingerprint sensor system, which may be a component of the biometric authentication system 102 that is described with reference to FIG. 1. In some implementations, the GUI 400e may include a textual prompt for the nominee to place a particular digit (such as the right thumb, the left pinky finger, etc.) on the fingerprint icon 435 (or at least within the area 430).

According to some examples, the "nominee credentials" for unlocking the apparatus 101 include may include one or more other types of biometric data, such as retinal image data, facial image data, voice data, or combinations thereof. In some such examples, block 310 of FIG. 3 (or a preceding block) may involve presenting a GUI for acquiring one or more other types of biometric data. In some such implementations, area 420 of the GUI 400e may be presented, but instead of presenting the area 425 with a textual prompt for a nominee to place a finger on the fingerprint icon 435, another type of textual prompt may be presented for the acquisition of a different type of biometric data.

FIGS. 5A, 5B, 5C, 5D and 5E show additional examples of graphical user interfaces (GUIs) for configuring conditional access to a device. The numbers, types and arrangements of elements shown in the figures provided herein, including but not limited to those of FIGS. 5A-5E, are merely examples. Other examples may include different elements, different arrangements of elements, or combinations thereof. In some implementations, an audio prompt may be presented instead of, or addition to, textual prompts like those of FIGS. 5A-5E. In these examples, the apparatus 101 shown in FIGS. 5A-5E is an instance of the apparatus 101 of FIG. 1. According to these examples, the control system 106 (not shown) is controlling the display system 110 to present the GUIs 500a-500e.

Figure 5C:
FIGS. 5A, 5B, 5C, 5D and 5E show additional examples of graphical user interfaces (GUIs) for configuring conditional access to a device.
Figure 5B:
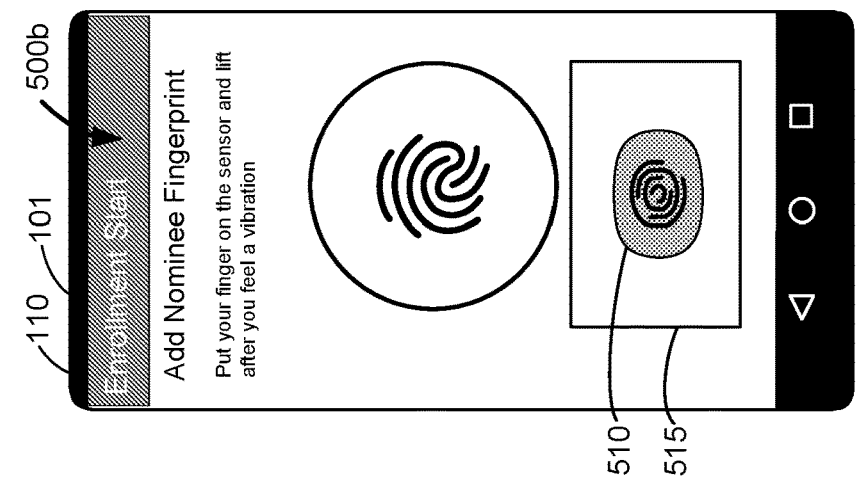
Figure 5A:
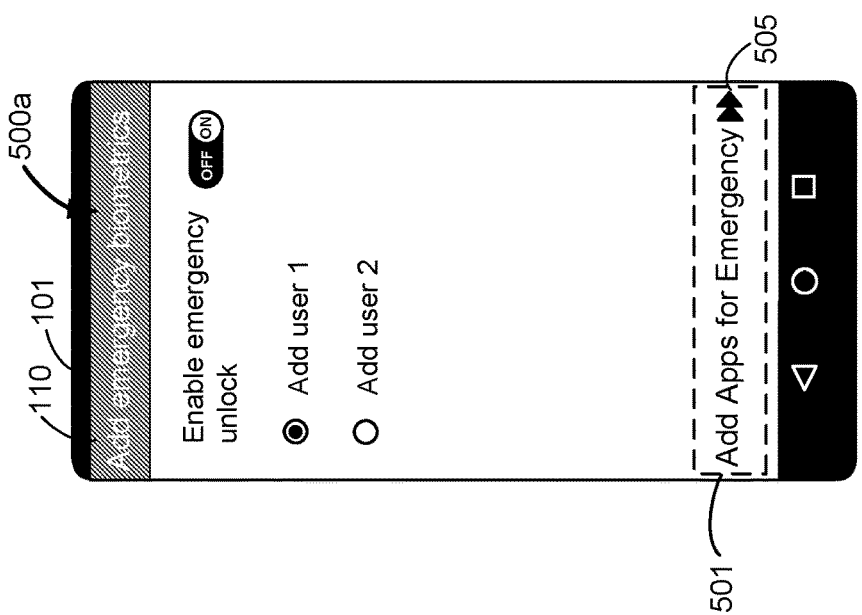

FIG. 5A shows an example of a GUI 500a for specifying parameters for conditional access to a device. In this example, the GUI 500a is an "Add Emergency Biometrics" GUI, which allows a user (such as the first authorized user) to initiate an enrollment process for a nominee referenced as User 1, for a nominee referenced as User 2, or for both nominees. In some examples, User 1 may correspond to the "second authorized user" disclosed herein and User 2 may correspond to the "third authorized user" disclosed herein. In some examples, the GUI 500a may be presented after a user selects the "Add Emergency Unlock" feature that is described with reference to FIG. 4B. According to this example, the GUI 500a includes an "Enable emergency unlock" area which a user may toggle on or off in order to indicate whether an emergency unlock feature will be enabled. In some alternative examples, the GUI 500a may not include an "Enable emergency unlock" area. In some such examples, this feature may be automatically enabled when a user selects the "Add Emergency Unlock" area of the GUI 400b, or a corresponding feature of a similar GUI.

According to some examples, an emergency unlock feature may be used to allow at least partial access to the apparatus 101 by the second authorized user, by the third authorized user, or both, even if the first authorized user has accessed the apparatus within the time interval that is described with reference to block 305 of FIG. 3. In some examples, an emergency unlock feature may be used to allow at least partial access to the apparatus by the second authorized user, the third authorized user, or both, even if a control system of the apparatus 101 has not determined that the condition that is described with reference to block 305 has been met.

However, in other examples the emergency unlock feature may be enabled responsive to detecting an emergency condition. For example, the emergency unlock feature may be enabled responsive to receiving health condition data indicating an emergency condition of the first authorized user, such as a heart attack, a stroke, an accident, etc. Alternatively, or additionally, the emergency unlock feature may be enabled responsive to receiving SOS data that indicates an emergency condition of the first authorized user.

According to some implementations, the emergency unlock feature may allow only partial access to data or apps stored on the apparatus or accessible via the apparatus. For example, the emergency unlock feature may allow access only to data, software apps, etc., that have been selected by the first authorized user. In the example shown in FIG. 5A, the GUI 500a includes an "Add Apps for Emergency" area 501, with which the first authorized user may interact (e.g., by touching the arrows 505) in order to cause the apparatus to present one or more additional GUIs for the selection of software apps that will be accessible via the emergency unlock feature. Some examples are provided by FIG. 5C and the corresponding description. In some implementations, the GUI 500a (or another GUI) may include an area with which the first authorized user may interact in order to cause the apparatus to present one or more additional GUIs for the selection of data that will be accessible (or inaccessible) via the emergency unlock feature.

In some implementations, after the time interval that is described with reference to block 305 of FIG. 3 the second authorized user, the third authorized user, or both, may be provided with complete access to all data or apps stored on the apparatus or accessible via the apparatus. In alternative implementations, complete access to all data or apps stored on the apparatus or accessible via the apparatus may not be granted, even after the time interval has elapsed. In some such implementations, the first authorized user may be able to select data, one or more apps, or both data and one or more apps that will be accessible (or that will not be accessible) even after the time interval has elapsed.

In this example, the user has interacted with the "Add user 1" field of the GUI 500a (for example, by touching the circle in the "Add user 1" field) and has selected the "Add user 1" option. According to this example, selection of the "Add user 1" option causes one or more additional GUIs to be presented for obtaining one or more types of biometric data from a person designated as "user 1," who may in some examples be the second authorized user described herein. In some examples, the user may select one or more types of biometric data that will be obtained from user 1. Such biometric data may include fingerprint image data, facial image data, retinal image data, voice data, etc. Alternatively, or additionally, some examples may involve assigning a password to user 1 for an authentication process that is at least in part password-based.

FIG. 5B shows an example of a GUI 500b that may be presented after a user has selected the "Add user 1" option of the GUI 500a. According to this example, the GUI 500b is an "Add Nominee Fingerprint" GUI, which includes text and a fingerprint icon 510 within an area 515. In some examples, the area 515 may correspond with an active area of a fingerprint sensor system, which may be a component of the biometric authentication system 102 that is described with reference to FIG. 1. In this example, the GUI 500b includes a textual prompt for the nominee (in this example, user 1, who may be an example of the second authorized user disclosed herein) to place a finger on the fingerprint icon 510 (or at least within the area 515) and to lift the finger after the nominee detects a vibration. As noted elsewhere herein, the word "finger" as used herein may correspond to any digit, including a thumb. Accordingly, a thumbprint is a type of fingerprint. The vibration may, for example, indicate that fingerprint image data has been successfully obtained from the digit. The vibration may, for example, be caused by a haptic feedback system of the apparatus 101, which may be part of the interface system 104 in some implementations.

A digit of the second authorized user may be referred to herein as a "second authorized user digit." Likewise, a digit of the third authorized user may be referred to herein as a "third authorized user digit." According to some implementations, the emergency unlock feature may require fingerprint data corresponding to the second authorized user digit, the third authorized user digit, or both, to be specific digits. Accordingly, in some implementations, the GUI 500b (or another GUI) may include a textual prompt for the nominee to place a particular digit (such as the right thumb, the left pinky finger, etc.) on the fingerprint icon 510 (or at least within the area 515).

FIG. 5C shows an example of a GUI 500c for selecting software apps to be made available via the emergency unlock feature. According to some examples, a control system of the apparatus 101 may control the display system 110 to present the GUI 500c responsive to a user's interaction with the "Add Apps for Emergency" area 501 of FIG. 5A. In this example, the GUI 500c includes a field corresponding to each of a plurality of software apps and a corresponding circle that a user may touch to select an app to be made available via the emergency unlock feature.

In some alternative implementations, a user may be presented with a GUI that allows the user to select one or more software apps that will not be made available via the emergency unlock feature. In some examples, the user may be willing to allow access to most or all other apps via the emergency unlock feature. However, the user may not wish for financial data or financial apps, such as a payment app, a crypto wallet, etc., to be made accessible via the emergency unlock feature. Therefore, it may in some instances be easier to select the apps that will not be made available via the emergency unlock feature. In some implementations, a user may be presented with a GUI that allows the user to select one or more software apps that will not be made available even after the time interval that is described with reference to block 305 of FIG. 3 has elapsed.

According to this example, a user may interact with the "DONE" area 520, in this instance by touching the arrows 522, in order to cause the apparatus 101 to present another GUI. In some instances, such as when biometric data from a second and third authorized user are necessary for the emergency unlock feature and when biometric data from only one has been acquired, a user's interaction with the "DONE" area 520 may cause the apparatus 101 to present the GUI 500a or a similar GUI. In other instances, such as when biometric data from a second and third authorized user are necessary for the emergency unlock feature and when biometric data from both has been acquired, a user's interaction with the "DONE" area 520 may cause the apparatus 101 to present the GUI 400a, the GUI 400b or a similar GUI.

Figure 5E:
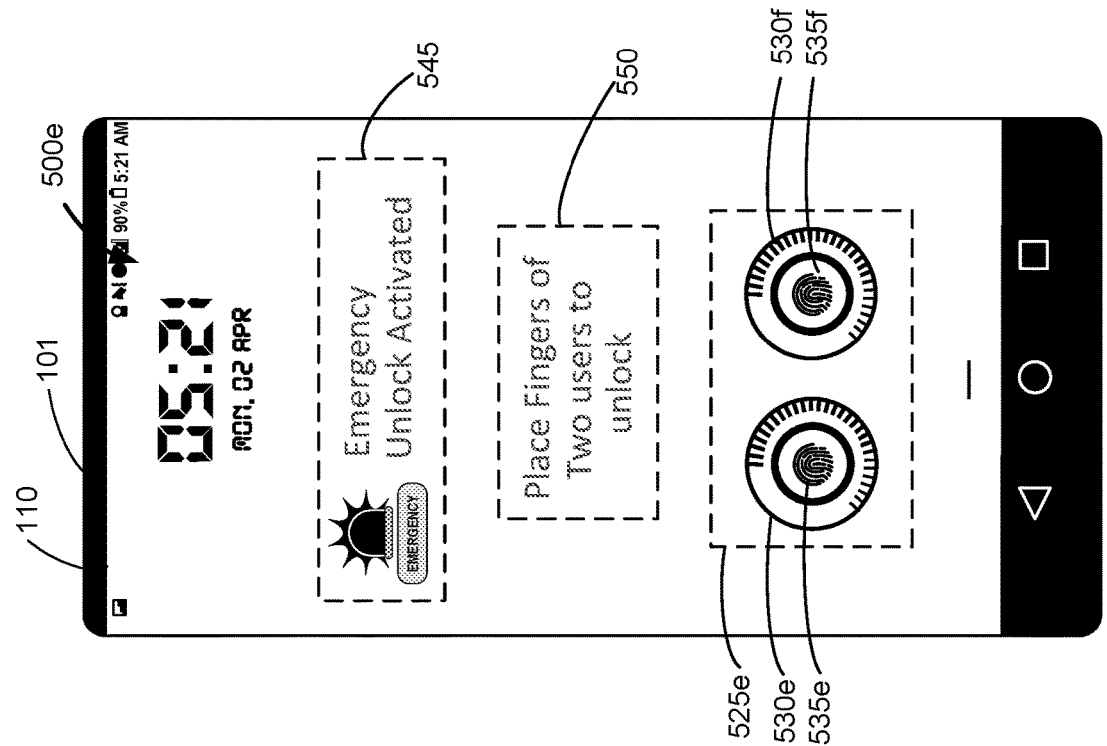
Figure 5D:
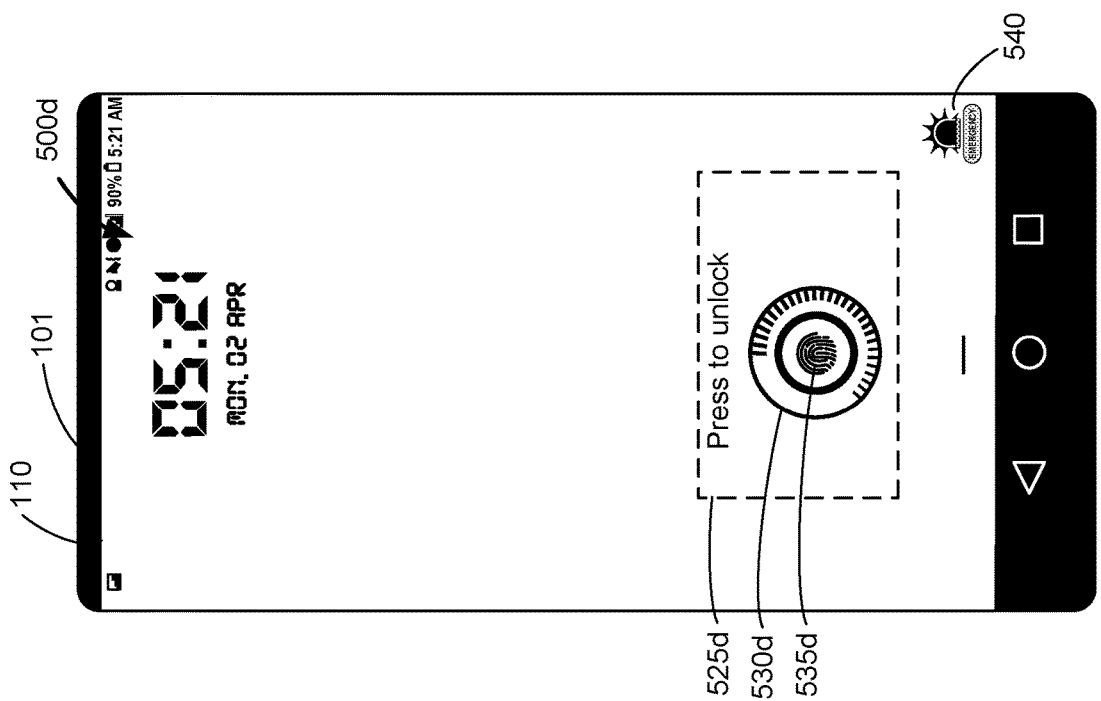

FIG. 5D shows an example of a GUI 500d that may be presented after the emergency unlock feature has been enabled and when the apparatus 101 is in a locked condition. In this example, area 525d of the GUI 500d includes a textual prompt for the primary user to place a finger on the fingerprint icon 535d (or at least within the area 530d) in order to unlock the apparatus 101, for example under non-emergency circumstances. In this example, at least a portion of the area 525d corresponds with an active area of a fingerprint sensor system, which may be a component of the biometric authentication system 102 that is described with reference to FIG. 1.

According to this example, the GUI 500d also includes an emergency unlock icon 540. In this example, if the apparatus 101 displays the emergency unlock icon 540 when the apparatus is in a locked condition, this is an indication that the emergency unlock feature has been enabled. According to this example, a person may interact with the emergency unlock icon 540 in order to cause the apparatus 101 to display one or more GUIs for accessing the apparatus 101 via the emergency unlock feature. In some examples, only a nominee (such as the second authorized user or the third authorized user) can cause the apparatus 101 to display one or more GUIs for implementing the emergency unlock feature by touching the emergency unlock icon 540. In some such examples, the emergency unlock icon 540 may be presented in an active area of a fingerprint sensor system. According to some such examples, fingerprint image data corresponding to a nominee may need to be obtained in the area of the emergency unlock icon 540 in order to cause the apparatus 101 to display one or more GUIs for enabling the emergency unlock feature. The fingerprint image data may be obtained by a fingerprint sensor system when the nominee places a digit in the area of the emergency unlock icon 540.

FIG. 5E shows an example of a GUI 500e that may be presented on the apparatus 101 after a person has successfully interacted with the emergency unlock icon 540 of the GUI 500d. In this example, the GUI 500e includes text and an image in the area 545, indicating that the emergency unlock feature has been activated. According to this example, the GUI 500e includes a textual prompt in the area 550, indicating that fingers of two users (such as the second authorized user and the third authorized user) are required to unlock the apparatus 101. In some examples, fingerprint data must be successfully acquired from specified digits of the second authorized user and the third authorized user in order to unlock the apparatus 101, such as the middle left finger of the second authorized user and the thumb of the third authorized user. In some such examples, the GUI 500e, or a similar GUI, may include a textual prompt indicating the specified digits of the second authorized user and the third authorized user.

In this example, area 525e of the GUI 500e includes fingerprint icons 535e and 535f and surrounding areas 530e and 530f, for placement of the fingers of two users (such as the second authorized user and the third authorized user) that are required to unlock the apparatus 101. In this example, at least a portion of the area 525e corresponds with an active area of a fingerprint sensor system, which may be a component of the biometric authentication system 102 that is described with reference to FIG. 1. The proximity of the area 550 to the area 525e makes it clear to a user that the textual prompt in the area 550 refers to the fingerprint icons 535e and 535f and surrounding areas 530e and 530 of the area 525e. According to some such examples, the GUI 500e, or a similar GUI, may include a textual prompt indicating which specified digits should be placed in the fingerprint icons 535e and 535f or surrounding areas 530e and 530.

According to some examples, the biometric data required for unlocking the apparatus 101 when the emergency unlock feature has been activated may include one or more other types of biometric data, such as retinal image data, facial image data, voice data, or combinations thereof. In some such examples, the GUI 500*e* (or one or more other GUIs) may be presented for the acquisition of one or more different types of biometric data.

Implementation examples are described in the following numbered clauses:

1. An apparatus, including: a biometric authentication system; and a control system configured for communication with the biometric authentication system, the control system configured to: determine whether either a) a first authorized user has accessed the apparatus within a time interval or b) a condition is met; and responsive to determining that the first authorized user has not accessed the apparatus within a time interval or that the condition is met, allow at least partial access to the apparatus by a second authorized user.

2. The apparatus of clause 1, where the biometric authentication system includes a fingerprint sensor system.

3. The apparatus of clause 1 or clause 2, where determining whether the first authorized user has accessed the apparatus within the time interval involves determining whether the first authorized user has accessed the apparatus by successfully completing an authentication process involving the biometric authentication system within the time interval.

4. The apparatus of any one of clauses 1-3, where the apparatus includes a cellular telephone.

5. The apparatus of any one of clauses 1-4, where allowing at least partial access to the apparatus involves allowing at least partial access to data stored on the apparatus or data accessible via the apparatus.

6. The apparatus of any one of clauses 1-5, where allowing at least partial access to the apparatus involves allowing access to one or more software applications accessible via the apparatus.

7. The apparatus of clause 6, where allowing access to one or more software applications accessible via the apparatus involves allowing access to one or more of a financial account app, a payment app, a tax preparation app or a social media app.

8. The apparatus of any one of clauses 1-7, where allowing at least partial access to the apparatus involves allowing at least partial access to image data or video data stored on the apparatus or accessible via the apparatus.

9. The apparatus of any one of clauses 1-8, where allowing at least partial access to the apparatus involves allowing complete access to all data stored on the apparatus, all data accessible via the apparatus and all software applications accessible via the apparatus.

10. The apparatus of any one of clauses 1-9, where the control system determines that the condition has not been met and where the control system is further configured to deny any access to the apparatus by the second authorized user responsive to determining that the first authorized user has accessed the apparatus within the time interval.

11. The apparatus of any one of clauses 1-10, where the control system determines that the first authorized user has accessed the apparatus within the time interval and where the control system is further configured to: receive, via the biometric authentication system, second authorized user biometric data; receive, via the biometric authentication system, third authorized user biometric data from a third authorized user; authenticate the second authorized user biometric data and the third authorized user biometric data; and allow at least partial access to the apparatus by at least one of the second authorized user or the third authorized user.

12. The apparatus of clause 11, where the second authorized user biometric data includes fingerprint data corresponding to a second authorized user digit and where the third authorized user biometric data includes fingerprint data corresponding to a third authorized user digit.

13. The apparatus of clause 12, where the second authorized user digit and the third authorized user digit are specific digits.

14. The apparatus of any one of clauses 11-13, where allowing at least partial access to the apparatus involves allowing only partial access to data stored on the apparatus or data accessible via the apparatus.

15. The apparatus of any one of clauses 11-14, where allowing at least partial access to the apparatus involves allowing complete access to all data stored on the apparatus, all data accessible via the apparatus and all software applications accessible via the apparatus.

16. The apparatus of any one of clauses 1-15, where the apparatus includes, or is configured for communication with, a health evaluation system configured for obtaining health condition data corresponding to a health condition of the first authorized user and for providing the health condition data to the control system, and where determining whether the condition is met is based, at least in part, on the health condition data.

17. The apparatus of clause 16, where the health evaluation system resides in a wearable device that is separate from, but configured for communication with, the apparatus.

18. The apparatus of clause 16 or clause 17, where the health evaluation system is configured for obtaining one or more types of cardiac data and where the health condition data includes the cardiac data.

19. The apparatus of any one of clauses 16-18, where the health evaluation system is configured for obtaining respiratory data and where the health condition data includes the respiratory data.

20. The apparatus of any one of clauses 1-19, where the apparatus is configured to receive vehicle accident data corresponding to a vehicle owned or controlled by the first authorized user and where determining whether the condition is met is based, at least in part, on the vehicle accident data.

21. The apparatus of any one of clauses 1-20, where the apparatus is configured to receive SOS data from another device owned or controlled by the first authorized user, the SOS data indicating an emergency involving the first authorized user, and where determining whether the condition is met is based, at least in part, on the SOS data.

22. A method of controlling access to an apparatus, the method including: determining whether either a) a first authorized user has accessed the apparatus within a time interval or b) a condition is met; and responsive to determining that the first authorized user has not accessed the apparatus within a time interval or that the condition is met, allowing at least partial access to the apparatus by a second authorized user.

23. The method of clause 22, where allowing at least partial access to the apparatus involves allowing at least partial access to data stored on the apparatus, data accessible via the apparatus, one or more software applications accessible via the apparatus, or a combination thereof.

24. The method of clause 22 or clause 23, further including denying any access to the apparatus by the second authorized user responsive to determining that the first authorized user has accessed the apparatus within the time interval.

25. The method of any one of clauses 22-24, further including obtaining health condition data corresponding to a health condition of the first authorized user, and where determining whether the condition is met is based, at least in part, on the health condition data.

26. The method of any one of clauses 22-25, where the health condition data includes cardiac data, respiratory data, or a combination thereof.

27. One or more non-transitory storage media having software stored thereon, the software including instructions for controlling one or more devices to perform a method of controlling access to an apparatus, the method including: determining whether either a) a first authorized user has accessed the apparatus within a time interval or b) a condition is met; and responsive to determining that the first authorized user has not accessed the apparatus within a time interval or that the condition is met, allowing at least partial access to the apparatus by a second authorized user.

28. The one or more non-transitory storage media of clause 27, where the method involves obtaining health condition data corresponding to a health condition of the first authorized user, and where determining whether the condition is met is based, at least in part, on the health condition data.

29. An apparatus, including: biometric authentication means; and control means configured for communication with the biometric authentication means, the control means including means for: determining whether either a) a first authorized user has accessed the apparatus within a time interval or b) a condition is met; and responsive to determining that the first authorized user has not accessed the apparatus within a time interval or that the condition is met, allowing at least partial access to the apparatus by a second authorized user.

30. The apparatus of clause 29, where the apparatus includes, or is configured for communication with, health evaluation means for obtaining health condition data corresponding to a health condition of the first authorized user and for providing the health condition data to the control means, and where determining whether the condition is met is based, at least in part, on the health condition data.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations presented herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order presented or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

What is claimed is:

1. An apparatus, comprising:
   a biometric authentication system; and
   a control system configured for communication with the biometric authentication system, the control system configured to:
   determine whether either a) a first authorized user has accessed the apparatus within a time interval or b) a condition is met;
   responsive to determining that the first authorized user has not accessed the apparatus within a time interval or that the condition is met, allow at least partial access to the apparatus by a second authorized user; and
   responsive to determining that the first authorized user has accessed the apparatus within the time interval:
   receive, via the biometric authentication system, second authorized user biometric data;
   receive, via the biometric authentication system, third authorized user biometric data from a third authorized user;
   authenticate the second authorized user biometric data and the third authorized user biometric data; and
   allow at least partial access to the apparatus by at least one of the second authorized user or the third authorized user.

2. The apparatus of claim 1, wherein the biometric authentication system includes a fingerprint sensor system.

3. The apparatus of claim 1, wherein determining whether the first authorized user has accessed the apparatus within the time interval involves determining whether the first authorized user has accessed the apparatus by successfully completing an authentication process involving the biometric authentication system within the time interval.

4. The apparatus of claim 1, wherein the apparatus comprises a cellular telephone.

5. The apparatus of claim 1, wherein allowing at least partial access to the apparatus involves allowing at least partial access to data stored on the apparatus or data accessible via the apparatus.

6. The apparatus of claim 1, wherein allowing at least partial access to the apparatus involves allowing access to one or more software applications accessible via the apparatus.

7. The apparatus of claim 6, wherein allowing access to one or more software applications accessible via the apparatus involves allowing access to one or more of a financial account app, a payment app, a tax preparation app or a social media app.

8. The apparatus of claim 1, wherein allowing at least partial access to the apparatus involves allowing at least partial access to image data or video data stored on the apparatus or accessible via the apparatus.

9. The apparatus of claim 1, wherein allowing at least partial access to the apparatus involves allowing complete access to all data stored on the apparatus, all data accessible via the apparatus and all software applications accessible via the apparatus.

10. The apparatus of claim 1, wherein the control system determines that the condition has not been met and wherein the control system is further configured to deny any access to the apparatus by the second authorized user responsive to determining that the first authorized user has accessed the apparatus within the time interval.

11. The apparatus of claim 1, wherein the second authorized user biometric data comprises fingerprint data corresponding to a second authorized user digit and wherein the third authorized user biometric data comprises fingerprint data corresponding to a third authorized user digit.

12. The apparatus of claim 11, wherein the second authorized user digit and the third authorized user digit are specific digits.

13. The apparatus of claim 1, wherein allowing at least partial access to the apparatus involves allowing only partial access to data stored on the apparatus or data accessible via the apparatus.

14. The apparatus of claim 1, wherein allowing at least partial access to the apparatus involves allowing complete access to all data stored on the apparatus, all data accessible via the apparatus and all software applications accessible via the apparatus.

15. The apparatus of claim 1, wherein the apparatus includes, or is configured for communication with, a health evaluation system configured for obtaining health condition data corresponding to a health condition of the first authorized user and for providing the health condition data to the control system, and wherein determining whether the condition is met is based, at least in part, on the health condition data.

16. The apparatus of claim 15, wherein the health evaluation system resides in a wearable device that is separate from, but configured for communication with, the apparatus.

17. The apparatus of claim 15, wherein the health evaluation system is configured for obtaining one or more types of cardiac data and wherein the health condition data includes the cardiac data.

18. The apparatus of claim 15, wherein the health evaluation system is configured for obtaining respiratory data and wherein the health condition data includes the respiratory data.

19. The apparatus of claim 1, wherein the apparatus is configured to receive vehicle accident data corresponding to a vehicle owned or controlled by the first authorized user and wherein determining whether the condition is met is based, at least in part, on the vehicle accident data.

20. The apparatus of claim 1, wherein the apparatus is configured to receive SOS data from another device owned or controlled by the first authorized user, the SOS data indicating an emergency involving the first authorized user, and wherein determining whether the condition is met is based, at least in part, on the SOS data.

21. A method of controlling access to an apparatus, the method comprising:
obtaining health condition data corresponding to a health condition of a first authorized user;
determining whether either a) the first authorized user has accessed the apparatus within a time interval or b) a condition is met, wherein determining whether the condition is met is based, at least in part, on the health condition data; and
responsive to determining that the first authorized user has not accessed the apparatus within a time interval or that the condition is met, allowing at least partial access to the apparatus by a second authorized user.

22. The method of claim 21, wherein allowing at least partial access to the apparatus involves allowing at least partial access to data stored on the apparatus, data accessible via the apparatus, one or more software applications accessible via the apparatus, or a combination thereof.

23. The method of claim 21, further comprising denying any access to the apparatus by the second authorized user responsive to determining that the first authorized user has accessed the apparatus within the time interval.

24. The method of claim 21, wherein the health condition data includes cardiac data, respiratory data, or a combination thereof.

25. The method of claim 21, further comprising receiving vehicle accident data corresponding to a vehicle owned or controlled by the first authorized user and wherein determining whether the condition is met is based, at least in part, on the vehicle accident data.

26. One or more non-transitory storage media having software stored thereon, the software including instructions for controlling one or more devices to perform a method of controlling access to an apparatus, the method comprising:
obtaining health condition data corresponding to a health condition of a first authorized user;
determining whether either a) the first authorized user has accessed the apparatus within a time interval or b) a condition is met, wherein determining whether the condition is met is based, at least in part, on the health condition data; and
responsive to determining that the first authorized user has not accessed the apparatus within a time interval or that the condition is met, allowing at least partial access to the apparatus by a second authorized user.

27. The one or more non-transitory storage media of claim 26, wherein the method further comprises receiving vehicle accident data corresponding to a vehicle owned or controlled by the first authorized user and wherein determining whether the condition is met is based, at least in part, on the vehicle accident data.

28. The one or more non-transitory storage media of claim 26, wherein the health condition data includes cardiac data, respiratory data, or a combination thereof.

29. An apparatus, comprising:
a biometric authentication system; and
a control system configured for communication with the biometric authentication system, the control configured to:
determine whether either a) a first authorized user has accessed the apparatus within a time interval or b) a condition is met;
responsive to determining that the first authorized user has not accessed the apparatus within a time interval or that the condition is met, allow at least partial access to the apparatus by a second authorized user; and
responsive to determining that the first authorized user has accessed the apparatus within the time interval and that the condition has not been met, deny any access to the apparatus by the second authorized user.

30. The apparatus of claim 29, wherein the apparatus includes, or is configured for communication with, a health evaluation system configured for obtaining health condition data corresponding to a health condition of the first authorized user and for providing the health condition data to the control system, and wherein determining whether the condition is met is based, at least in part, on the health condition data.

* * * * *